United States Patent
Esswie

(10) Patent No.: US 12,501,312 B2
(45) Date of Patent: Dec. 16, 2025

(54) DYNAMIC PARTIAL BUFFER STATUS REPORTING

(71) Applicant: Dell Products L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 83 days.

(21) Appl. No.: 18/619,009

(22) Filed: Mar. 27, 2024

(65) Prior Publication Data
US 2025/0310824 A1   Oct. 2, 2025

(51) Int. Cl.
*H04W 28/02* (2009.01)

(52) U.S. Cl.
CPC .............. *H04W 28/0278* (2013.01)

(58) Field of Classification Search
CPC .............................. H04W 28/0278
USPC ........................................ 709/238
See application file for complete search history.

(56) References Cited

FOREIGN PATENT DOCUMENTS

CN    107925916 A  *  4/2018  ........ H04W 36/0033

* cited by examiner

*Primary Examiner* — Adil Ocak
(74) *Attorney, Agent, or Firm* — Amin, Turocy & Watson, LLP

(57) ABSTRACT

A user equipment may be configured to transmit to a radio network node a partial buffer status report to minimize use of uplink resources for transmission of control information. A partial buffer status report may comprise one or more volume index/indices indicative of buffered traffic volume corresponding to one or more logical channel group(s), individually with respect to which buffered traffic corresponding to a logical channel group satisfies a partial buffer status report reporting criterion. A partial buffer status report may avoid indicating buffered traffic volume corresponding to a logical channel group with respect to which buffered traffic does not satisfy a partial buffer status report reporting criterion. A partial buffer status report reporting criterion may be a volume criterion or a delay criterion. During a period of uplink channel congestion, the user equipment may avoid transmitting a full buffer status report.

20 Claims, 12 Drawing Sheets

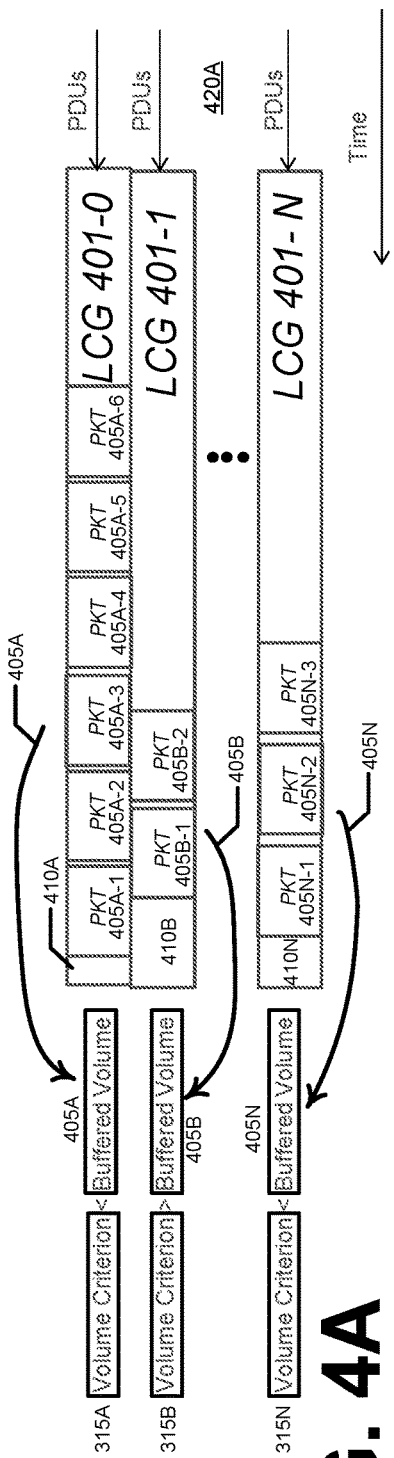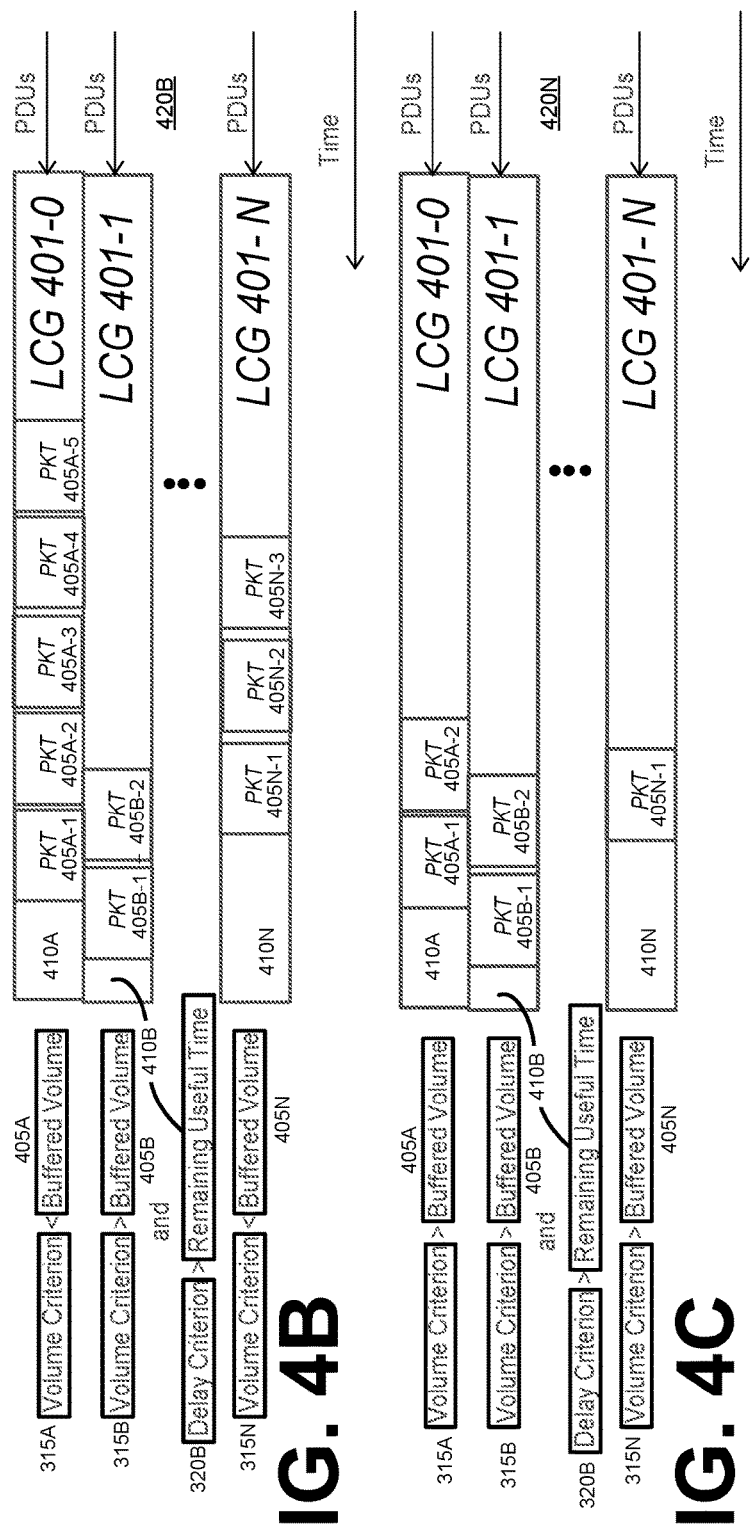
FIG. 4A
FIG. 4B
FIG. 4C

DYNAMIC PARTIAL BUFFER STATUS REPORTING

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise analyzing, by a user equipment comprising at least one processor, uplink traffic, buffered by the user equipment and associated with at least one logical channel group, with respect to at least one logical channel group buffered traffic reporting criterion to result in analyzed buffered logical channel group uplink traffic and determining by the user equipment, at least one of the at least one logical channel group with respect to which the analyzed buffered logical channel group uplink traffic satisfies the at least one logical channel group buffered traffic reporting criterion to result in at least one determined logical channel group. Based on the analyzed buffered logical channel group uplink traffic corresponding to the at least one determined logical channel group being determined to satisfy the at least one logical channel group buffered traffic reporting criterion, the method may further comprise generating, by the user equipment, a partial buffer status report comprising a logical channel group indication indicative of the at least one determined logical channel group and a volume index indicative of a size of the analyzed buffered logical channel group uplink traffic corresponding to the at least one determined logical channel group, and transmitting, by the user equipment to a radio access network node, the partial buffer status report. Responsive to transmitting the partial buffer status report, the method may further comprise receiving, by the user equipment from the radio access network node, a grant of at least one uplink resource to result in at least one granted uplink resource usable by the user equipment to transmit to the radio access network node the analyzed buffered logical channel group uplink traffic corresponding to the at least one determined logical channel group. The method may comprise transmitting, by the user equipment to the radio access network node, the analyzed buffered logical channel group uplink traffic corresponding to the at least one determined logical channel group according to the at least one granted uplink resource.

The partial buffer status report may exclude information corresponding to at least one of the at least one logical channel group other than the at least one determined logical channel group. The at least one logical channel group buffered traffic reporting criterion may comprise at least one buffered traffic volume criterion corresponding to the at least one logical channel group. The at least one logical channel group buffered traffic reporting criterion may comprise at least one buffered traffic delay criterion corresponding to the at least one logical channel group. The at least one logical channel group buffered traffic reporting criterion may be based on a quality-of-service associated with the at least one logical channel group. The partial buffer status reporting configuration may be received from the radio access network node. The user equipment may be a machine-to-machine device.

In an embodiment, the at least one logical channel group may comprise a first logical channel group and a second logical channel group. The at least one logical channel group buffer traffic reporting criterion may comprise a first logical channel group buffer traffic reporting criterion and a second logical channel group buffer traffic reporting criterion corresponding, respectively, to the first logical channel group and the second logical channel group.

In an embodiment, the method may further comprise executing, by the user equipment, an application, wherein the application generates the uplink traffic, buffered by the user equipment and associated with at least one logical channel group. Based on the application, the method may further comprise determining, by the user equipment, the at least one logical channel group buffered traffic reporting criterion.

In an embodiment, the uplink traffic, buffered by the user equipment and associated with at least one logical channel group, may correspond to downlink traffic associated with the at least one logical channel group. Based on the downlink traffic, the method may further comprise determining, by the user equipment, the at least one logical channel group buffered traffic reporting criterion.

In another example embodiment, a user equipment may comprise at least one processor configured to process executable instructions that, when executed by the at least one processor, facilitate performance of operations that may comprise receiving, from a radio network node, a partial buffer status reporting configuration comprising at least one logical channel group buffered traffic reporting criterion respectively associated with at least one logical channel group. The method may further comprise buffering uplink traffic corresponding to at least one of the at least one logical channel group to result in buffered uplink traffic and analyzing the buffered uplink traffic with respect to at least one of the at least one logical channel group buffered traffic reporting criterion corresponding to the buffered uplink traffic to result in analyzed buffered uplink traffic. The operations may further comprise determining at least one of the at least one logical channel group with respect to which the analyzed buffered uplink traffic satisfies the at least one logical channel group buffered traffic reporting criterion to result in at least one determined logical channel group.

Based on the analyzed buffered uplink traffic corresponding to the at least one determined logical channel group being determined to satisfy the at least one logical channel group buffered traffic reporting criterion, the operations may further comprise generating, by the user equipment, a partial buffer status report comprising a logical channel group indication indicative of the at least one determined logical channel group and a volume index indicative of a volume of the analyzed buffered uplink traffic corresponding to the at least one determined logical channel group and transmitting, by the user equipment to a radio access network node, the partial buffer status report. Responsive to transmitting the partial buffer status report, the operations may further comprise receiving, by the user equipment from the radio access network node, a grant of at least one uplink resource to result in at least one granted uplink resource usable by the user equipment to transmit to the radio network node the analyzed buffered uplink traffic corresponding to the at least one determined logical channel group, and transmitting, by the user equipment to the radio access network node, the analyzed buffered uplink traffic corresponding to the at least one determined logical channel group according to the at least one granted uplink resource.

In an embodiment, the partial buffer status reporting configuration may further comprise a non-partial buffer status report periodicity. The operations may further comprise determining an uplink channel congestion condition with respect to the radio network node to result in a determined uplink channel congestion condition. Based on the determined uplink channel congestion condition, the operations may further comprise avoiding transmitting a non-partial buffer status report according to the non-partial buffer status report periodicity. The determining the determined uplink channel congestion condition may comprise the analyzed buffered uplink traffic corresponding to the at least one determined logical channel group being determined to satisfy the at least one logical channel group buffered traffic reporting criterion.

In an embodiment, the at least one of the at least one logical channel group buffered traffic reporting criterion may comprise a first buffered traffic volume criterion corresponding to a first logical channel group of the at least one logical channel group and a second buffered traffic volume criterion corresponding to a second logical channel group of the at least one logical channel group. The analyzed buffered uplink traffic may comprise first analyzed buffered uplink traffic corresponding to the first logical channel group and second analyzed buffered uplink traffic corresponding to the second logical channel group. The first analyzed buffered uplink traffic may be determined to satisfy the at least one logical channel group buffered traffic reporting criterion based on the analyzed buffered uplink traffic comprising a first volume of buffered uplink traffic corresponding to the first logical channel group being not less than the first buffered traffic volume criterion. The second analyzed buffered uplink traffic may be determined not to satisfy the at least one logical channel group buffered traffic reporting criterion based on the analyzed buffered uplink traffic comprising a second volume of buffered uplink traffic corresponding to the second logical channel group being not greater than the second buffered traffic volume criterion. The volume index may be indicative of the first volume of buffered uplink traffic and the partial buffer status report may exclude information indicative of the second volume of buffered uplink traffic.

In an embodiment, the at least one of the at least one logical channel group buffered traffic reporting criterion may comprise a first buffered traffic delay criterion corresponding to a first logical channel group of the at least one logical channel group and a second buffered traffic delay criterion corresponding to a second logical channel group of the at least one logical channel group. The analyzed buffered uplink traffic may comprise first analyzed buffered uplink traffic corresponding to the first logical channel group and second analyzed buffered uplink traffic corresponding to the second logical channel group. The first analyzed buffered uplink traffic may be determined to satisfy the at least one logical channel group buffered traffic reporting criterion based on the analyzed buffered uplink traffic comprising at least one first packet, corresponding to the first logical channel group, having a remaining delay budget not greater than the first buffered traffic delay criterion. The second analyzed buffered uplink traffic may be determined not to satisfy the at least one logical channel group buffered traffic reporting criterion based on the analyzed buffered uplink traffic comprising a second packet, corresponding to the second logical channel group, having a remaining delay budget not less than the second buffered traffic delay criterion. The volume index may be indicative of a first volume of buffered uplink traffic corresponding to the first logical channel group. The partial buffer status report may exclude information indicative of a second volume of buffered uplink traffic corresponding to the second logical channel group.

In an embodiment, the partial buffer status reporting configuration may comprise a partial buffer status reporting enabled indication indicative to the user equipment that the radio network node has enabled partial buffer status reporting based on the radio network node determining that an uplink congestion value corresponding to at least one uplink resource associated with the radio network node satisfies at least one congestion criterion.

In yet another example embodiment, a non-transitory machine-readable medium may comprise executable instructions that, when executed by a processor of a user equipment, may facilitate performance of operations that may comprise buffering first traffic corresponding to a first traffic flow to result in first buffered traffic and buffering second traffic corresponding to a second traffic flow to result in second buffered traffic. The operations may further comprise analyzing the first buffered traffic with respect to at least one first traffic flow buffered traffic reporting criterion corresponding to the first traffic flow to result in analyzed first buffered traffic and analyzing the second buffered traffic with respect to at least one second traffic flow buffered traffic reporting criterion corresponding to the second traffic flow to result in analyzed second buffered traffic. The operations may further comprise determining that the analyzed first buffered traffic satisfies the at least one first traffic flow buffered traffic reporting criterion to result in determined first buffered traffic and determining that the analyzed second buffered traffic fails to satisfy the at least one second traffic flow buffered traffic reporting criterion. Based on the determined first buffered traffic being determined to satisfy the at least one first traffic flow buffered traffic reporting criterion, the operations may further comprise generating a partial buffer status report comprising a first traffic flow indication indicative of the first traffic flow and a volume index indicative of a size of the analyzed first buffered traffic and transmitting, to a radio network node, the partial buffer status report. Responsive to transmitting the partial buffer status report, the operations may comprise receiving, from the radio access network node, a grant of at least one uplink resource to result in at least one granted uplink resource usable by the user equipment to transmit, to the radio network node the determined first buffered traffic corresponding to the first traffic flow and transmitting, to the radio network node, the analyzed first buffered traffic corresponding to the first traffic flow according to the at least one granted uplink resource.

In an embodiment, the generating the partial buffer status report may comprise retrieving, from a configured first buffer stratus report table corresponding to the first traffic flow, the volume index.

In an embodiment, the partial buffer status report may exclude information corresponding to the analyzed second buffered traffic.

In an embodiment, the first buffered traffic may comprise first buffered uplink traffic corresponding to a first logical channel group and the second buffered traffic may comprise second buffered uplink traffic corresponding to a second logical channel group.

BRIEF DESCRIPTION OF THE DRAWINGS

FIGS. 4A-4C illustrate example buffered traffic.

DETAILED DESCRIPTION OF THE DRAWINGS

Figure 1:
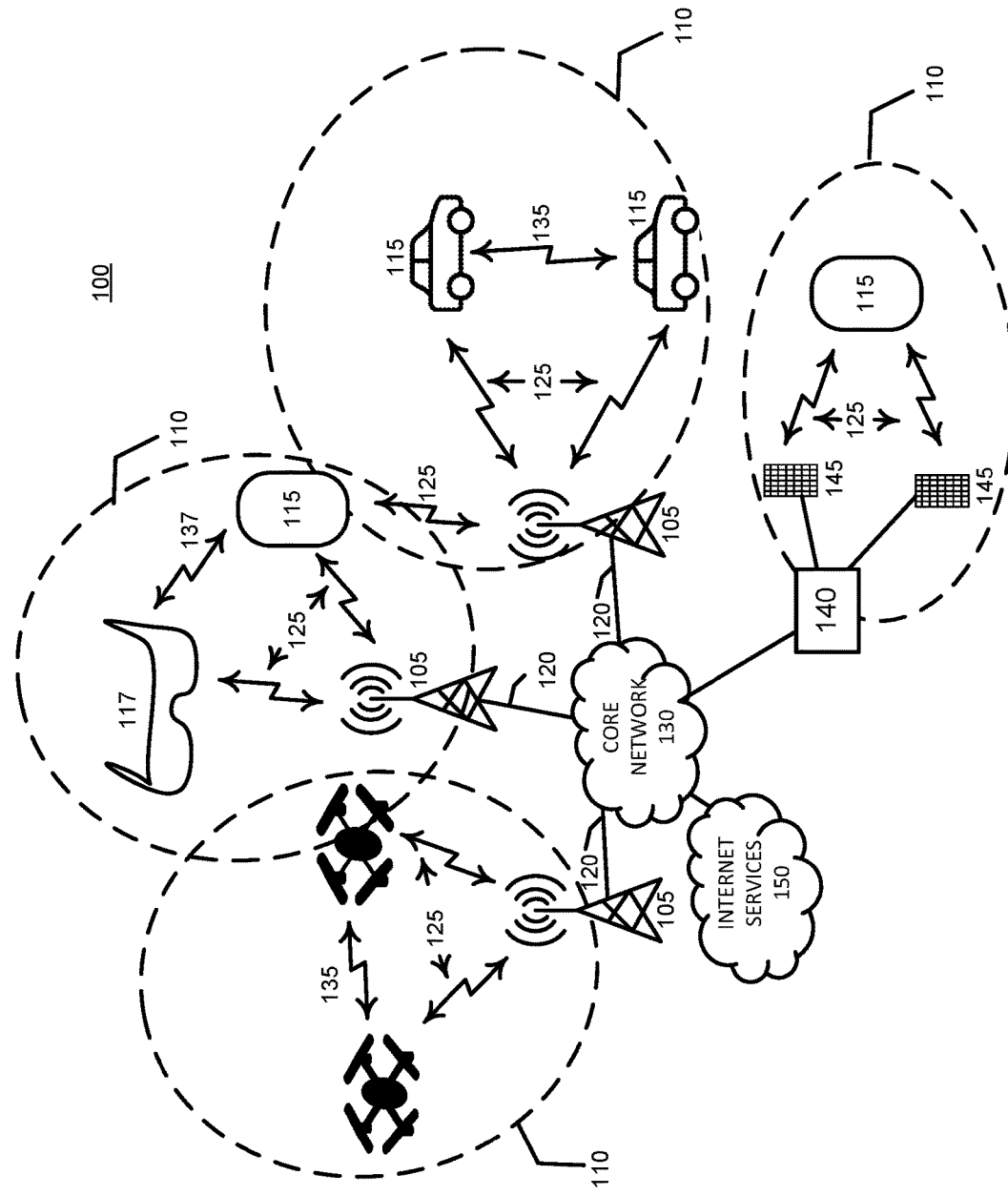
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

A 5G NR radio system typically comprises a physical downlink control channel ("PDCCH"), which may be used to deliver downlink and uplink control information to cellular user equipment devices. The 5G control channel may facilitate operation according to requirements of URLLC and eMBB use cases and may facilitate an efficient coexistence between such different QoS classes.

The PDCCH of a 5G NR system may deliver downlink and uplink control information to cellular devices. Compared to the control channel design of the fourth generation (e.g., LTE), the 5G control channel can match requirements of the URLLC and eMBB use cases and can offer an efficient coexistence between those different QoS classes.

The 5G PDCCH channel, unlike the Fourth Generation control channel, may be beamformed using favored-channel vectors of each UE, with embedded demodulation-assisting demodulation reference signals ("DMRS"). The PDCCH may be modulated by a fixed QPSK modulation scheme and with a conservative coding rate such as the reliability of receiving the PDCCH channel at a UE device is maximized. For example, to satisfy a URLLC 10e-5 reliability level, the PDCCH channel decoding ability may be enhanced at the device end.

The resource size of each PDCCH channel, which may be carrying the downlink control information ("DCI") of one or more UEs, may be time-varying, and may be referred to as PDCCH aggregation level. In particular, and to enhance PDCCH decoding, the network may increase the resource size of the PDCCH channel and accordingly adopt a more conservative and resource-less-efficient coding rate of the PDCCH. This implies that same amount of PDCCH control information is transmitted with a stronger coding rate (i.e., more redundant bits for error detection and correction) at the expense of consuming more channel resources for transmitting the PDCCH information.

There are two types of PDCCH channels. First, the UE-specific PDCCH, where a set channel resources are periodically monitored by a single UE/device. After being configured, the device will attempt to blindly decode those candidate resources in case they may be potentially carrying DCI information. This DCI information includes configurations on scheduled uplink or downlink grants, transmission configurations, and information on common system signaling and updates. Furthermore, the blind decoding is the process when the UE attempts decoding the DCI with all possible transmission configurations and aggregation levels. This implies a heavy power consumption on the device end; however, it is necessary because the UE is not yet aware about the actual configurations of the PDCCH channel and corresponding transmissions. It shall be aware of such after it successfully decodes the PDCCH. In the active mode, the UE may monitor the configured one or more PDCCH search spaces, where a search space implies a set of candidate resources that may carry the PDCCH/DCI information. The search space definitions may be used to refer to varying size of the PDCCH channel (i.e., aggregation levels) and hence, the required size of resources to carry the PDCCH may vary.

Common PDCCH search spaces are monitored by all UEs. Those common PDCCH channels typically carry DCI information that is relevant to all devices. Examples include system updates and control information, all-UE power control information, and general system information.

For each scheduled downlink or uplink transmission, there typically is a preceding PDCCH control transmission informing the UE device about resources scheduled by the network for the transmission, and transmission configurations to use for transmission in the uplink or reception in the downlink. Accordingly, the PDCCH transmissions are considered as signaling overhead, which should be always minimized, and needed for successful device transmission and/or reception.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 11.

Continuing with discussion of FIG. 1, base stations 105 may be dispersed throughout a geographic area to form the wireless communication system 100 and may be devices in different forms or having different capabilities. Base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 via one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A user equipment device with uplink traffic to be transmitted may transmit an uplink scheduling request ("SR") via an uplink control channel between the user equipment and a radio access network node ("RAN") that is serving the UE after establishing an initial connection with the network RAN node. The transmission of the SR indicates to the RAN node useful information, such as the availability of uplink traffic at the device side so that the RAN can accordingly allocate a set of available uplink resources that are appropriate to the UE with respect to uplink traffic to be transmitted thereby. However, the network/RAN node needs to be aware of the size, or amount, of uplink traffic to be transmitted by the UE to allocate a suitable amount of uplink resources (e.g., scheduled uplink transmission occasions at a certain periodicity and at a certain frequency or within a certain frequency range). A buffer status report ("BSR") transmitted by a UE to a RAN node may convey to the RAN node an amount of traffic to be transmitted by the UE.

Conventionally, a BSR report is transmitted from a UE device toward a serving base station (e.g., a serving RAN node) comprising information indicating a size, volume, or amount of uplink traffic buffered at the UE. Buffer status reporting of buffer information from user equipment devices toward a serving cell/RAN node may facilitate indicating to the serving RAN node a current uplink traffic amount buffered at the user equipment, and accordingly, the network RAN node can allocate an appropriate amount of uplink resources to accommodate delivery to the RAN node of the buffered uplink traffic. To reduce the BSR reporting overhead, which is used for every uplink transmission including BSRs, several buffered traffic size ranges are typically defined where each range is associated with a BSR index, which may be an integer index. Thus, instead of transmitting an actual value corresponding to an amount of buffered uplink traffic, a user equipment device may only transmit a BSR index that may comprise fewer bits/bytes than an actual value that corresponds to buffered traffic.

Accordingly, to reduce the amount of BSR reporting overhead (e.g., uplink resources used for buffer status reporting instead of being used to transmit actual uplink traffic packets), the exact size/amount of buffered uplink traffic is quantized into several predefined/configured size ranges and/or levels. A table of predefined BSR size ranges and associated BSR indexes is typically defined and configured in UE device, where each BSR index corresponds to a certain BSR range, (e.g., an index corresponds to a certain size/volume/amount range in terms of bytes, for example).

Conventional BSR reporting techniques include only an index from a configured BSR table that corresponds to the current size of all buffered uplink traffic. The BSR table may be common to all user equipment even though different user equipment may facilitate delivery of traffic having different traffic profiles and different buffering statistics (e.g., length of time traffic has been buffered). Thus, in case of multiple independent traffic flows generated by an application layer corresponding to the user equipment (e.g., multiple available logical channel groups ("LCG")), conventional BSR reporting techniques report a BSR indicative of all LCGs which correspond to traffic buffered in a user equipment, which may result in high uplink signaling control overhead of to facilitate BSR reporting for a user equipment. If a RAN node is serving multiple user equipment, each having multiple traffic flows corresponding to different LCGs, especially in case of multiple simultaneous user equipment devices adopting multi-traffic-flow applications, uplink resources may be allocated to facilitate delivery of BSRs to the radio access network node which could otherwise be allocated for use of delivery of useful data (e.g., data traffic instead of control channel traffic). Accordingly, embodiments disclosed herein may facilitate reducing consumption of uplink resources to transmit buffer status reports that may be adaptively generated based on traffic characteristics corresponding to traffic buffered in a buffer of a user equipment. Embodiments disclosed herein may facilitate reporting of low-overhead partial BSR reports during periods of uplink resource starvation with respect to a radio access network node such that latency-critical uplink traffic flow volumes (e.g., LCG traffic volumes) are timely reported to the serving RAN node, which may accordingly timely schedule uplink resources for uplink transmission of traffic flow volumes indicated in a partial buffer status report. During periods that the RAN node may experience less network-resource-constrained uplink capacity (e.g., during periods of low uplink resource congestion) a user equipment may determine to transmit a conventional BSR report that consumes more signaling resource overhead than partial buffer status reporting disclosed herein, to facilitate indication to the serving RAN node of all traffic flow volumes, (e.g., latency-critical and latency-non-critical traffic flows) buffered by the user equipment.

Embodiments disclosed herein may facilitate a user equipment dynamically determining buffer status report reporting format and behavior based on analyzing buffered traffic flows with respect to configured criterion to adaptively select buffered traffic volumes to be reported via a partial buffer status report. A traffic condition corresponding to buffered traffic that a user equipment may analyze with respect to a configured criterion may comprise a remaining time corresponding to buffer traffic before a traffic flow corresponding to the buffered traffic experiences an outage (e.g., a latency criterion is violated or an application being executed by a processor corresponding to the user equipment is disrupted). Accordingly, unlike with conventional techniques that require either single-flow traffic flow BSR reports or BSR reports that indicate buffered traffic volume for all traffic buffered by a user equipment, embodiments disclosed herein may facilitate user equipment dynamically reporting BSR reports that include BSR information of a variable number of LCGs/traffic flows, based on which buffered LCGs approach theoretical/configured latency requirements corresponding to the traffic flows, or based on buffered traffic exceeding buffered traffic volume threshold criteria corresponding to the logical channel groups/traffic flows.

Dynamic Partial Buffer Status Reporting.

Figure 2:
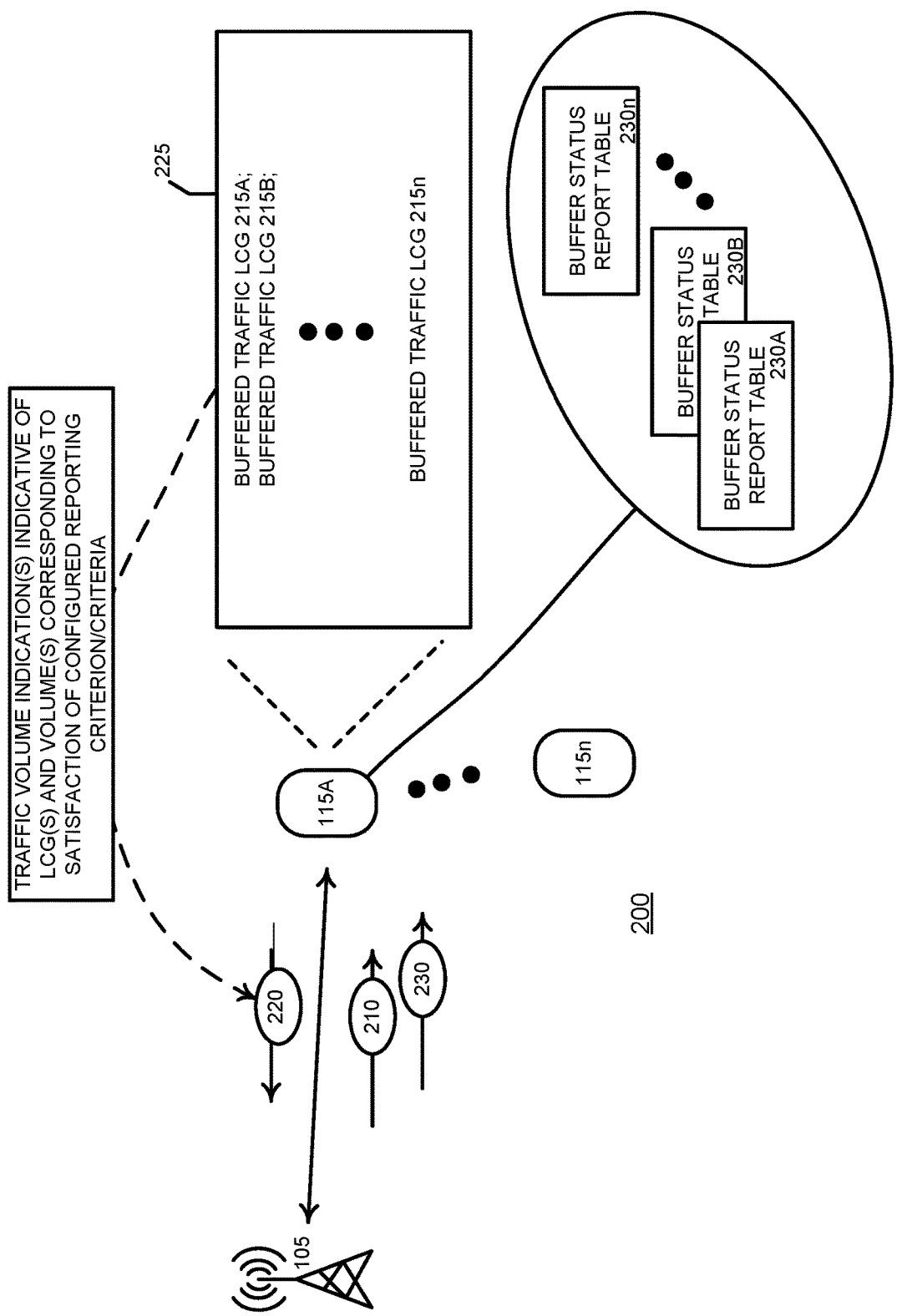
FIG. 2 illustrates an example environment with a radio access network node transmits one or more buffer status reporting configurations to one or more user equipment.

Turning now to FIG. 2, the figure illustrates environment 200. In environment 200, serving radio access network node 105 may transmit to one or more user equipment 115A-115n, one or more partial buffer status reporting configurations 210. One or more of partial buffer status reporting configurations 210 may be the same. A partial buffer status reporting configuration 210 may be specific to a particular user equipment 115A-115n. A user equipment 115 may determine an amount of traffic 225 buffered in a buffer, or memory, corresponding to the user equipment. Based on information indicated in a partial buffer status reporting configuration 210, the user equipment may determine at least one partial buffer status report 220, or partial buffer status report indication, indicative of an amount of traffic 225 buffered by the user equipment corresponding to at least one of at least one traffic flow corresponding to at least one of at least one logical channel group. A user equipment 115 may transmit a partial buffer status report 220 to radio access network node 105 to be used thereby to determine uplink resources that may be usable by the user equipment to transmit buffered traffic corresponding to the at least one of the at least one logical channel groups as indicated in partial buffer status report 220. A user equipment 115 may determine information to include in a partial buffer status report 220 based on one or more buffer status report tables 230. In an embodiment, different buffer status report tables 230 may correspond to different logical channel groups. In an embodiment, different buffer status report tables 230 may correspond to different user equipment.

Figure 3:
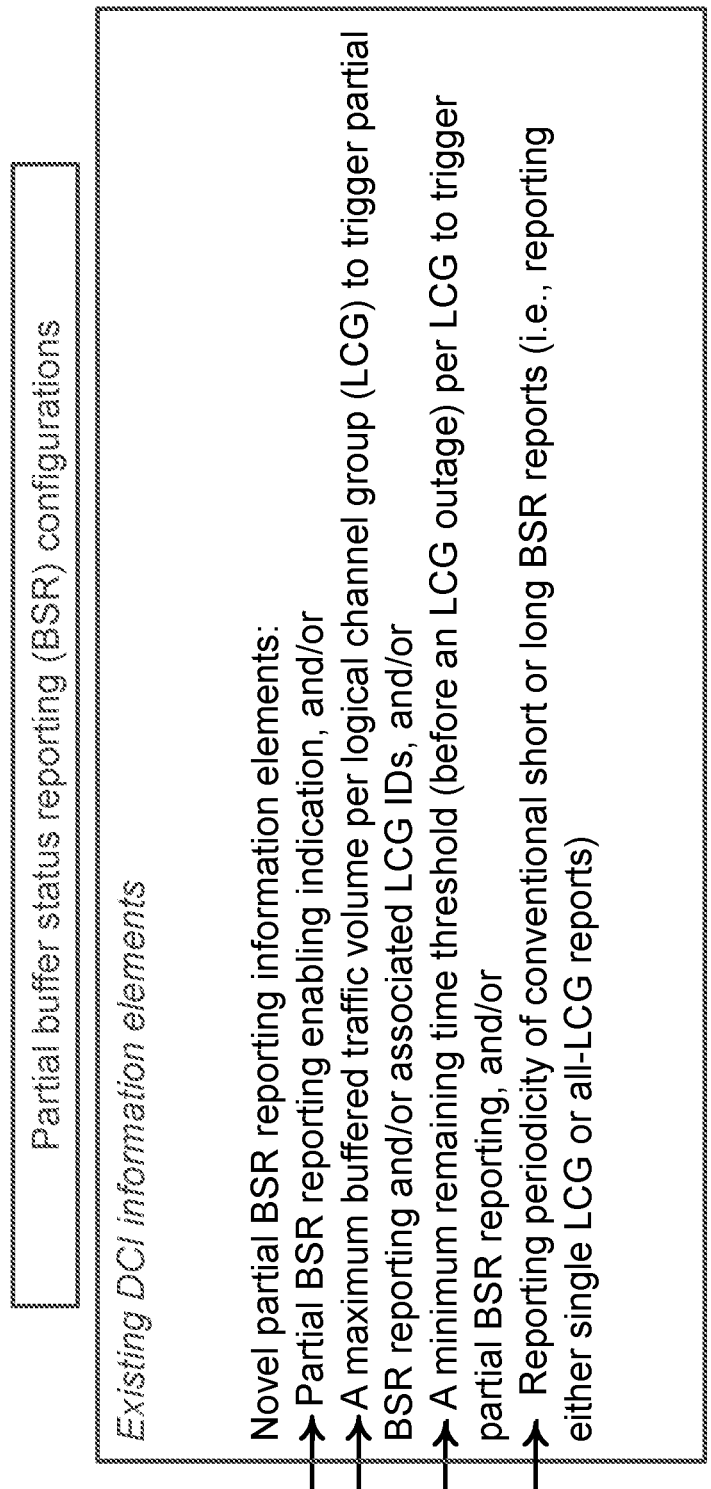
FIG. 3 illustrates an example partial buffer status reporting configuration.

As shown in FIG. 3, partial buffer status report configuration 210 may comprise at least one of: partial BSR reporting enabling indication 310 to be indicative to a user equipment that partial buffer status reporting is enabled with respect to a radio access network node that transmitted the partial buffer status report configuration. Configuration 210 may comprise a maximum buffered traffic volume per logical channel group criterion 315 usable to trigger partial BSR reporting of a logical channel group identifier, or traffic flow identifier, associated with a logical channel group or traffic flow with respect to which a user equipment that receives the partial buffer status report configuration may have traffic buffered in a buffer corresponding to the user equipment. Configuration 210 may comprise a minimum remaining time criterion 320, which may be referred to as a delay criterion, which may correspond to, or which may be based on, a latency requirement, or quality of service associated with a logical channel group or traffic flow—the minimum remaining time criterion/delay criterion may be usable by user equipment to trigger partial BSR reporting. Configuration 210 may comprise a reporting periodicity indication 325 corresponding to conventional short or long BSR reports (e.g., a short BSR report that comprises information corresponding to a single LCG if a buffer only comprises traffic corresponding to the single LCG, or a long BSR that comprises information corresponding to all LCGs if a buffer comprises traffic corresponding to multiple LCGs).

Enabling indication 310 of partial BSR configuration 210 may be indicative that RAN node 105, shown in FIG. 2, has enabled partial buffer status reporting during uplink congestion periods. RAN node 105 may determine to enable partial buffer status reporting based on uplink resource congestion corresponding to the RAN node. Triggering threshold(s)/criterion/criteria 315 or 320 may be usable by user equipment to determine when to generate and transmit a partial BSR report toward a serving RAN node. For example, despite a user equipment having traffic corresponding to multiple buffered LCGs/traffic flows buffered in an uplink buffer, the user equipment may report only a partial BSR report indicating buffered traffic volume of a single LCG (or a set of active LCGs), being facilitated by the user equipment, that satisfies either or both configured criterion 315 or 320. Thus, BSR uplink resource overhead (e.g., uplink resources not used for delivery of data payload) may be reduced during a period of uplink resource congestion by using a partial BSR, which may be smaller, or consume less uplink control resources, as compared to conventional short or long BSRs, while still timely reporting BSR information corresponding to critical LCGs/traffic flows.

As shown FIG. 4A, a UE/WTRU may monitor and determine a buffered traffic volume per each of one or more LCGs stored in buffer 420A. The user equipment may determine a remaining time 410 before an LCG outage/latency violation occurs (e.g., disruption of an application being executed by the user equipment) with respect to an oldest-buffered packet corresponding to an LCG. Traffic volume 405A comprises packets 405A-1 . . . 405A-6 corresponding to LCG 401-0 and traffic volume 405N comprises packets 405N-1 . . . 405N-3 corresponding to LCG 401-N. Packets corresponding to LCG 401-0 and packets corresponding to LCG 401-N exceed respective configured volume criterion 315A and 315N. Accordingly, LCG 401-0 and 401-N are indicated in partial buffer status report 220A shown in FIG. 5A.

Figure 5A:
FIGS. 5A-5C illustrate example partial buffer status reports indicative of volumes of example buffered traffic.

Partial BSR 220A, shown in FIG. 5A, indicates LCG 401-0 and 401-N in fields 515A and 515B, respectively, and BSR indexes corresponding to amounts/volumes 405A and 405N in fields 510A field 510B, respectively. Reporting of partial BSR 220A may be triggered by buffered volumes exceeding a criterion 315, or by a determined remaining time 410 satisfying triggering condition/criterion 320. In the example shown in FIG. 4A, remaining times 410A and 410N may be less than a configured remaining time criterion 320, but because volumes 405A and 405N exceed respective volume criteria 315A and 315N, partial BSR 220A may be generated to indicate volumes 405A and 405N. As shown in FIG. 4A, volume 405B is not greater than configured 315B and remaining time 410B is not less than a configured delay criterion 320. Thus, partial BSR 220A does not comprise an indication indicative of traffic volume 405B. On condition of a determined buffered traffic volume exceeding a corresponding configured maximum buffered traffic volume criterion 315 or on condition of a packet corresponding to buffered traffic having a remaining time that is not greater than a configured delay criterion 320, a UE/WTRU 115 may temporarily override a configured conventional short or long BSR reporting periodicity indicated in field 325 of configuration 210 and initiate transmission of partial BSR report 220A that comprises buffer information corresponding to LCGs 401-0 and 401-N, which buffered packets satisfied triggering criterion 310 or 315. As shown in FIG. 5A, BSR 220A does not comprise buffer information corresponding to LCG 410-1 because packets corresponding thereto, as shown in FIG. 4A, are less in volume than the configured volume criterion 315B and have a minimum remaining time that is greater than a corresponding delay criterion 320.

Figure 5B:

In an example shown in FIG. 4B, a UE/WTRU may monitor and determine a buffered traffic volume per each of one or more LCG stored in buffer 420B. The user equipment may determine a remaining time 410 before an LCG outage/latency violation occurs. Traffic volume 405A comprising packets corresponding to LCG 401-0 and volume 405N comprising packets corresponding to 401-N exceed respective configured volume criterion 315A and 315N. Accordingly, LCG 401-0 and 401-N are indicated in partial buffer status report 220B shown in FIG. 5A. Similar to partial BSR 220A shown in FIG. 5A, partial BSR 220B shown in FIG. 5B indicates LCG 401-0 and 401-N in fields 515A and 515B, respectively, and BSR indexes corresponding to the amounts/volumes 405A and 405N in fields 510A field 510B, respectively. Remaining times 410A and 410N may be less than a configured remaining time criterion 320, but because volumes 405A and 405N exceed respective volume criteria 315A and 315N, partial BSR 220A may already be generated to indicate volumes 405A and 405N. Also similar to BSR 220A shown in FIG. 5A, as shown in FIG. 4B, volume 405B is not greater than configured volume criterion 315B. However, unlike the example shown in FIG. 4A, in the example shown in FIG. 4B, remaining time 410B is less than remaining time criterion, or delay criterion, 320B. Thus, partial BSR 220B also comprises an indication indicative of traffic volume 405B.

Figure 5C:

In the example shown in FIG. 4C, a UE/WTRU may monitor and determine a buffered traffic volume per each of one or more LCG stored in buffer 420C. Traffic volume 405A corresponding to LCG 401-0 and volume 405N corresponding to LCG 401-N may comprise packets having volumes that do not exceed respective configured volume criterion 315A and 315N. Packets corresponding to LCGs 401-0 and 401-N do not comprise packets with determined respective remaining times being less than corresponding delay criteria 315A or 315N. Accordingly, LCG 401-0 and 401-N are not indicated in partial buffer status report 220C shown in FIG. 5C. Although traffic volume 405B, corresponding to packets 405B-1 and 405-2 buffered in buffer 420N, does not exceed volume criterion 405B, remaining time 410B is shown in FIG. 4C as being less than delay criterion 320B. Accordingly, partial BSR 220C comprises an indication/index in field 510B indicative of traffic volume 405B but does not comprise indications indicative of traffic corresponding to LCGs 401-0 and 401-N.

UE/WTRU 115 may transmit a partial BSR 220 as an uplink control information message towards serving RAN node. A partial BSR 220 may comprise buffered traffic volume information (e.g., a BSR index 510) corresponding to a buffered traffic volume indicated by at least one LCG indication in field 515 that has one or more buffered packets corresponding to satisfaction of one or both of criterion 515 or criterion 520. As shown in FIG. 2, UE/WTRU 115 may receive, from RAN node 105, an uplink resource grant 230 (e.g., resource allocation) that is based on BSR index/indices 510 indicated in partial buffer status report 220. UE/WTRU 105 may schedule and transmit buffered payload corresponding to LCGs 401-0 and 401-N indicated in partial buffer status report 220 via granted uplink resource indicated in grant 230.

Figure 6:
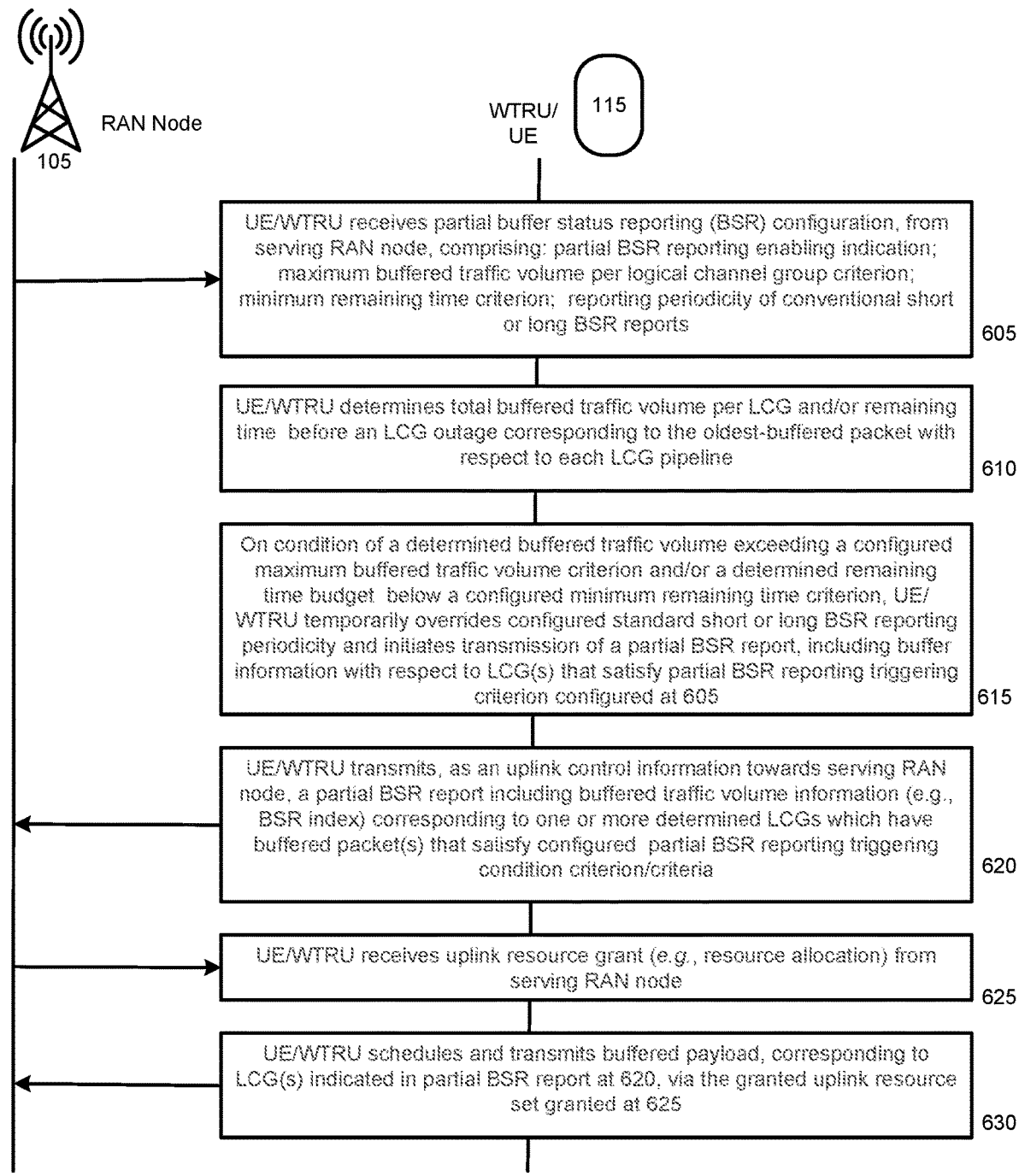
FIG. 6 illustrates a timing diagram of an example method to provide a partial buffer status report to a serving radio access network node.

Turning now to FIG. 6, the figure illustrates a timing diagram of an example method 600. At act 605, UE 115 WTRU may receive partial buffer status reporting configuration 210 (described in reference to FIG. 2) from serving RAN node 105. Partial BSR configuration 210 may comprise: a partial BSR reporting enabled indication; a maximum buffered traffic volume per logical channel group usable by UE 115 to trigger partial BSR reporting with respect to associated LCG identifiers; or a minimum remaining time criterion indicative of an allowable time before an LCG outage occurs. The allowable remaining time criterion may be based on a quality of service corresponding to an LCG to which the remaining time criterion is associated. The allowable remaining time criterion may be usable by UE 115 to trigger partial BSR reporting. Configuration 210 may comprise a reporting periodicity corresponding to conventional short BSR or long BSR reporting (e.g., reporting buffer status corresponding to a single LCG or buffer status corresponding to all-LCGs being facilitated by UE 115. At act 610, UE/WTRU may monitor and determine a total buffered traffic volume per LCG and/or a remaining time before an LCG outage with respect to an oldest-buffered packet corresponding to each LCG pipeline occurs.

At act 615, on condition of a buffered traffic volume, determined with respect to an LCG, exceeding a maximum buffered traffic volume threshold/criterion configured via configuration 210 received at 605, or on condition of a remaining time budget before an LCG outage occurs determined with respect to the LCG as being below a minimum remaining time threshold configured via configuration 210, UE/WTRU may temporarily override configured conventional short or long BSR reporting periodicity and generate a partial BSR report, including buffer information corresponding to LCGs determined to correspond to satisfaction of triggering criterion indicated in configuration 210 (e.g., indicated in fields 315 or 320). At act 620, UE/WTRU may transmit, as an uplink control information message towards serving RAN node, a partial BSR report, generated at act 615, comprising buffered traffic volume information (e.g., one or more BSR index/indices) corresponding only to LCG(s) with respect to which packets buffered by UE 115 satisfy the partial BSR reporting triggering conditions configured via configuration 210.

At act 625, responsive to transmitting the partial buffer status report at act 620, UE/WTRU may receive an uplink resource grant from RAN node 105. At act 630, UE/WTRU 115 may schedule and transmit buffered payload corresponding to LCGs indicated in the partial BSR report transmitted at act 620 via uplink resources granted at act 625.

Figure 7:
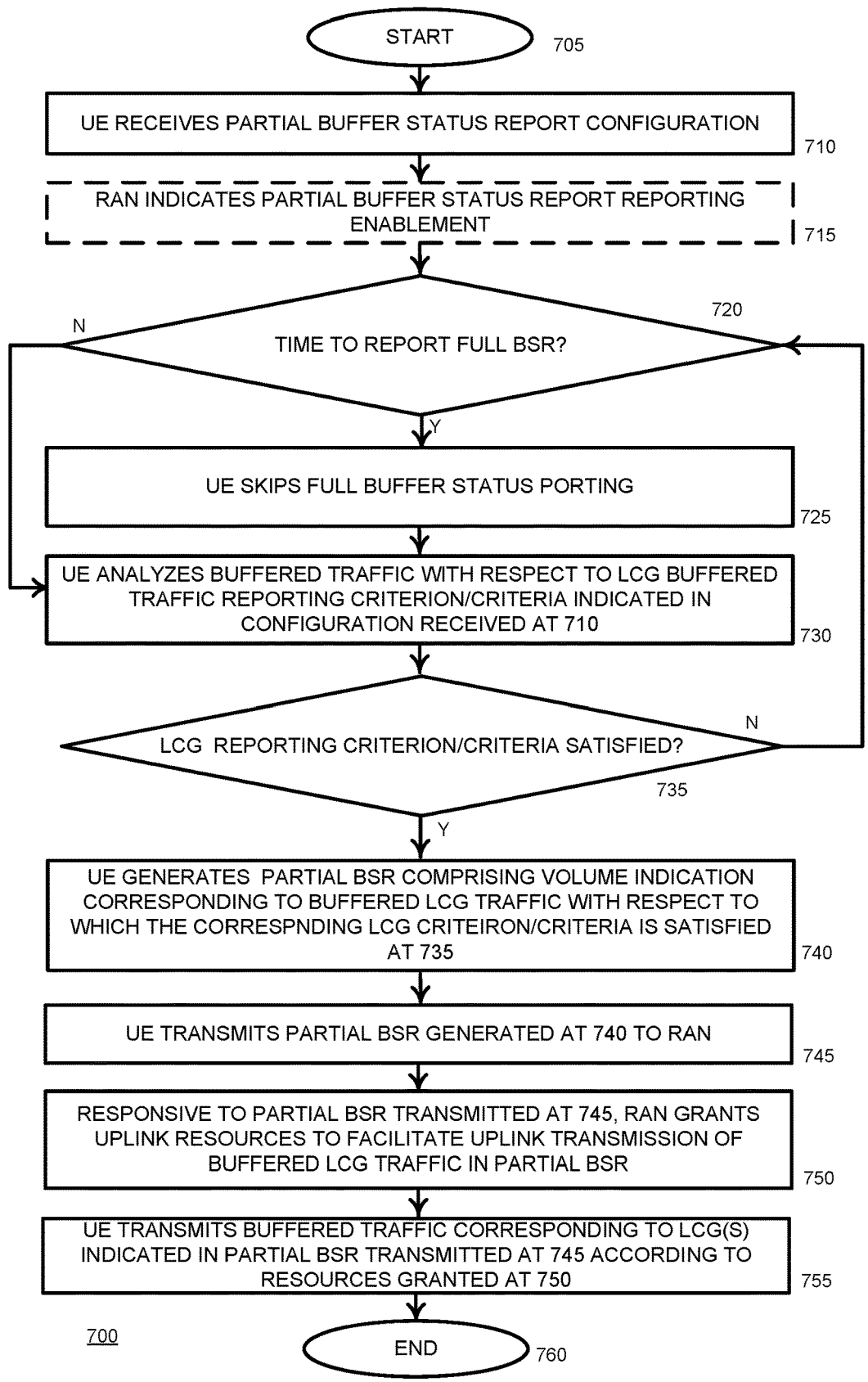
FIG. 7 illustrates a flow diagram of an example method to use a partial buffer status reporting configuration to determine and provide a buffer status report to a radio access network node.

Turning now to FIG. 7, the figure illustrates a flow diagram of a method 700 to configure a UE to use one or more buffer status report tables to report to a serving radio access network node an amount of traffic, buffered by the user equipment, to be transmitted to the serving radio access network node, to facilitate the radio access network node allocating resources that may be usable by the user equipment to transmit the buffered traffic to the radio access network node. Method 700 begins at act 705. At act 710, a user equipment may receive a partial buffer status reporting configuration, which may be referred to as a partial buffer status report reporting configuration or a partial buffer status report configuration. The partial buffer status report configuration may comprise at least one logical channel group buffer traffic reporting criterion. A logical channel group buffered traffic reporting criterion may comprise a volume criterion or a delay criterion. The partial buffer status report configuration may comprise an indication of conventional buffer status report reporting timing information, such as, for example, a periodicity at which the user equipment is configured to transmit conventional short or long buffer status reports. A conventional short buffer status report may comprise a volume indication indicative of a volume of traffic, buffered in a buffer corresponding to the user equipment, corresponding to a single logical channel group if only traffic associated with the single logical channel group is buffered in the buffer. A conventional long buffer status report may comprise multiple volume indications indicative of volumes of buffered uplink traffic corresponding to multiple logical channel groups with respect to which uplink traffic is buffered by a user equipment.

A partial buffer status reporting configuration received at act 710 may comprise a partial buffer status report reporting enablement indication indicative that a radio access network node serving the user equipment may have enabled partial buffer status report reporting. At act 715, the radio access network node may indicate to the user equipment that the radio access network node has enabled partial buffer status report reporting. Block 715 is shown in dashed lines to indicate that the indication of partial buffer status report reporting being enabled may be indicated via a partial buffer status report reporting indication enablement message that is different from the partial buffer status report configuration received at act 710, or to indicate that indication of partial buffer status report reporting being enabled may be indicated via the partial buffer status report configuration received at act 710. For example, if the radio access network node determines that a state of uplink channel resource congestion exists, the radio access network node may indicate via a separate partial buffer status reporting enablement indication message that the radio access network node has enabled partial buffer status report reporting by the user equipment. In an embodiment, the user equipment may determine that uplink resource channel congestion exists and thus an enablement indication, such as an indication indicated in field 310 of configuration 210 shown in FIG. 3, may be indicative to the user equipment that the user equipment may override, or skip, configured normal transmission of conventional short or long buffer status reports. During periods of uplink channel resource congestion, the user equipment configured via the configuration received at 710 may suppress, or avoid, transmission of conventional short or long buffer status reports until the congestion condition is determined to no longer exist. In an embodiment, the user equipment may continue to generate and transmit conventional short or long buffer status reports and the user equipment may also generate and transmit partial buffer status reports as disclosed herein.

At act 720, the user equipment may determine whether, according to a configured conventional buffer status report reporting periodicity, a conventional long or short buffer status report should be generated and transmitted to the radio access network node. In the embodiment shown in FIG. 7, if the user equipment determines at act 720 that, according to a configured conventional buffer status report reporting periodicity the user equipment should generate and transmit a conventional buffer status report, the user may skip, or avoid, transmitting a conventional/full buffer status report. At act 730, the user equipment may analyze buffered uplink traffic with respect to at least one logical channel group buffered traffic reporting criterion indicated in the partial buffer status reporting configuration received at act 710. The user equipment may have traffic packets associated with multiple logical channel groups buffered in a buffer. The partial buffer status reporting configuration received at act 710 may comprise one or more criterion corresponding to each of the multiple logical channel groups. For example, if traffic buffered by the user equipment comprises traffic packets associated with a first logical channel group, a second logical channel group, and a third logical channel group, the user equipment may analyze buffered traffic corresponding to the first logical channel group with respect to a volume criterion uniquely corresponding to the first logical channel group or a delay criterion corresponding to the first logical channel group, wherein the configuration received at act 710 comprises the first logical channel group volume criterion and the first logical channel group delay criterion. Similarly, the user equipment may analyze buffered traffic corresponding to the second logical channel group with respect to a volume criterion uniquely corresponding to the second logical channel group or a delay criterion uniquely corresponding to the first logical channel group, and so on for buffered traffic packets corresponding to the third logical channel group and with respect to traffic packets that the user equipment may have buffered that correspond to other logical channel groups. Returning to description of act 720, if the user equipment determines that a full/conventional buffer status report according to a configured periodicity is not to be transmitted, method 700 may advance to act 730 and the user equipment may analyze buffered uplink traffic as previously described.

Continuing with the example, wherein the user equipment may have traffic packets buffered corresponding to first second and third logical channel groups, at act 735, the user equipment may determine whether buffered traffic corresponding to at least one logical channel group satisfies a reporting criterion that is associated in the configuration received at act 710 with the at least one logical channel group. For example, the user equipment may determine whether buffered traffic packets corresponding to the first logical channel group, analyzed at act 730, satisfy a volume reporting criterion corresponding to the first logical channel group or a delay reporting criterion corresponding to the first logical channel group. The volume reporting criterion, configured via field 315 in configuration 210 received at act 710, may be satisfied if an amount, or volume, of buffered uplink traffic packets corresponding to the first logical channel group exceeds a volume reporting criterion corresponding to the first logical channel group. The delay reporting criterion, configured via field 320 in configuration 210 received at act 710, may be satisfied if an oldest uplink traffic packet is determined by the user equipment to have a remaining time that is less than the delay reporting criterion. A packet corresponding to the first logical channel group that has been buffered by the user equipment longer than other uplink traffic packets corresponding to the first logical channel group may be deemed the 'oldest' buffered uplink traffic packet corresponding to the first logical channel group. The remaining time corresponding to the oldest packet may be a time remaining until transmission of the oldest packet would be 'late' insofar as 'late' transmission of the oldest packet would likely result in disruption of operation of an application being executed by the user equipment.

Satisfaction of a volume reporting criterion or a delay criterion, with respect to the first logical channel group, may trigger the user equipment to report buffer status corresponding to buffered packets associated with the first logical channel group in a partial buffer status report. Similarly, at act 735, the user equipment may determine whether buffered traffic packets corresponding to the second logical channel group, analyzed at act 730, satisfy a volume reporting criterion corresponding to the second logical channel group or a delay reporting criterion corresponding to the second logical channel group, and whether buffered traffic packets corresponding to the third logical channel group, analyzed at act 730, satisfy a volume reporting criterion corresponding to the third logical channel group or a delay reporting criterion corresponding to the third logical channel group. It will be appreciated that a volume reporting criterion or a delay reporting criterion corresponding, in the configuration received at act 710, to a particular logical channel group may be based on a quality of service associated with traffic corresponding to the particular logical channel group. For example, the more stringent a latency criterion associated with traffic corresponding to a particular logical channel group the smaller/lower a volume reporting criterion corresponding to the logical channel group may be or the larger/longer a delay reporting criterion corresponding to the logical channel group may be. If a determination is made at act 735 that uplink traffic buffered by the user equipment does not satisfy at least one volume or delay reporting criterion indicated in the configuration received at act 710, method 700 may return to act 720.

If, however, a determination is made at act 735 that at least one volume or delay reporting criterion indicated in the configuration received act 710 is satisfied, method 700 may advance to act 740. At act 740, the user equipment may generate a partial buffer status report that comprises at least one volume indication indicative of an amount/volume of uplink traffic corresponding to a particular logical channel group with respect to which the uplink traffic corresponding to the particular logical channel group was determined at act 730 to satisfy at least one of the volume reporting criterion or delay reporting criterion corresponding to the particular logical channel group. A partial buffer status report generated at act 740 may comprise multiple volume indications indicative of buffered uplink traffic corresponding to multiple particular logical channel groups with respect to which the corresponding buffered uplink traffic was determined at act 730 to satisfy a volume reporting criterion or a delay reporting criterion respectively corresponding, in the configuration received at act 710, to the multiple particular logical channel groups.

At act 745, the user equipment may transmit the partial buffer status report generated at act 740. At act 750, responsive to the partial buffer status report transmitted at act 745, the radio access network node may grant at least one uplink resource usable to facilitate uplink transmission, by the user equipment, of buffered logical channel group uplink traffic indicated in the partial buffer status report transmitted by the user equipment at act 745. At act 755, the user equipment transmits buffered uplink traffic corresponding to logical channel groups, with respect to which volume(s) of uplink traffic were indicated in the partial buffer status report transmitted act 745, according to the at least one resource granted at act 750. Method 700 advances to act 760 and ends.

It will be appreciated that a volume indication indicative of an amount of buffered uplink traffic corresponding to a logical channel group that is buffered in a buffer corresponding to the user equipment may be a volume index, indicative of a range that comprises the amount of buffered traffic, that may be retrieved from a buffer status reporting table. In an embodiment, a user equipment may be configured with multiple buffer status reporting tables, for example multiple tables 230 shown in FIG. 2, wherein a particular table 230 may be configured for use by a user equipment for reporting buffered traffic volume with respect to a particular logical channel group and wherein another particular table 230 may be configured for use by the user equipment for reporting buffered traffic volume with respect to a different particular logical channel group. In an embodiment, a buffer status reporting table 230 may be associated for use with a particular logical channel group based on a quality-of-service associated with traffic corresponding to the particular logical channel group. In an embodiment, a buffer status reporting table 230 may be associated for use with a particular user equipment.

Figure 8:
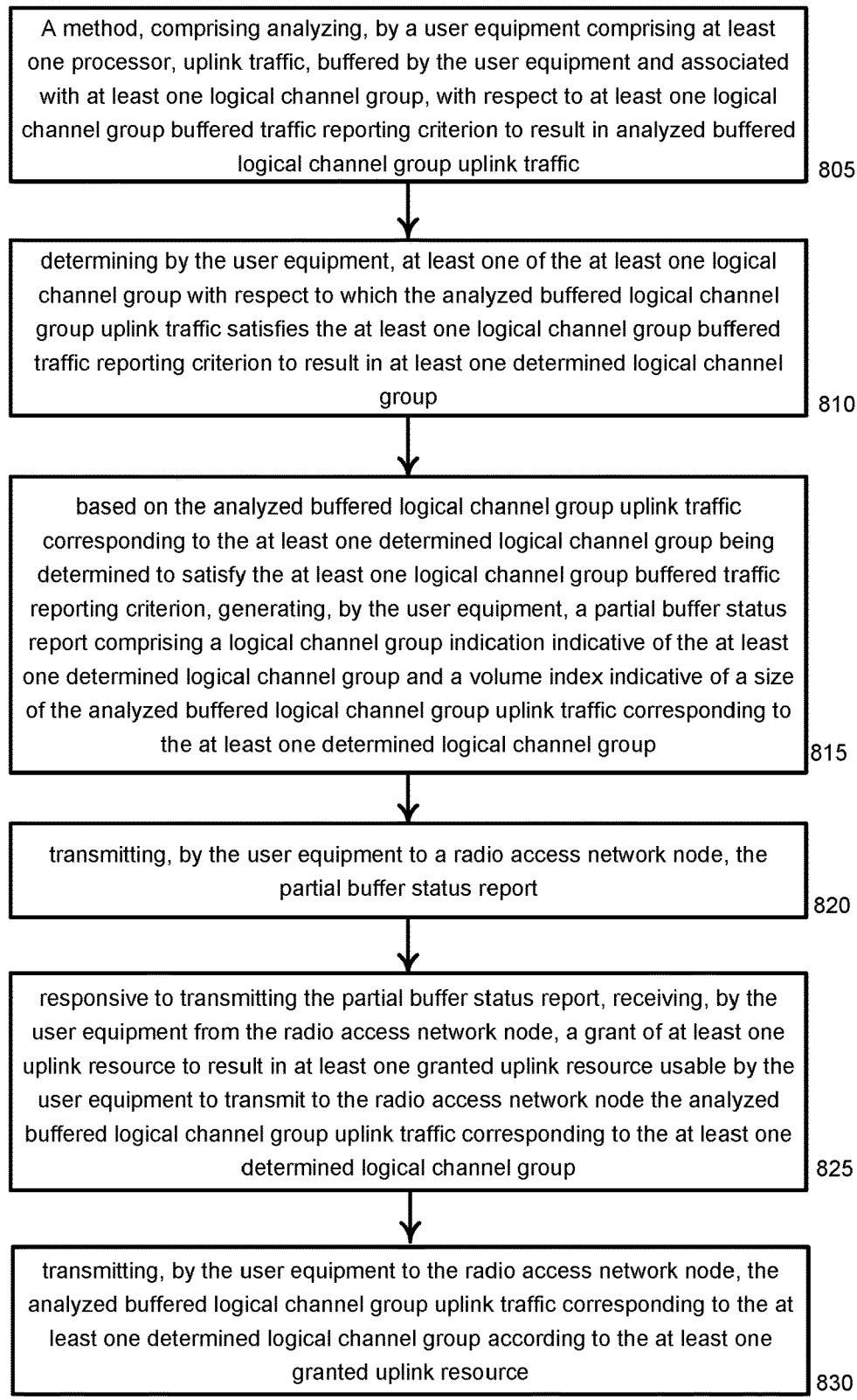
FIG. 8 illustrates a block diagram of an example method.

Turning now to FIG. 8, the figure illustrates an example embodiment method 800 comprising at block 805 analyzing, by a user equipment comprising at least one processor, uplink traffic, buffered by the user equipment and associated with at least one logical channel group, with respect to at least one logical channel group buffered traffic reporting criterion to result in analyzed buffered logical channel group uplink traffic; at block 810 determining by the user equipment, at least one of the at least one logical channel group with respect to which the analyzed buffered logical channel group uplink traffic satisfies the at least one logical channel group buffered traffic reporting criterion to result in at least one determined logical channel group; at block 815, based on the analyzed buffered logical channel group uplink traffic corresponding to the at least one determined logical channel group being determined to satisfy the at least one logical channel group buffered traffic reporting criterion, generating, by the user equipment, a partial buffer status report comprising a logical channel group indication indicative of the at least one determined logical channel group and a volume index indicative of a size of the analyzed buffered logical channel group uplink traffic corresponding to the at least one determined logical channel group; at block 820 transmitting, by the user equipment to a radio access network node, the partial buffer status report; at block 825 responsive to transmitting the partial buffer status report, receiving, by the user equipment from the radio access network node, a grant of at least one uplink resource to result in at least one granted uplink resource usable by the user equipment to transmit to the radio access network node the analyzed buffered logical channel group uplink traffic corresponding to the at least one determined logical channel group; and at block 830 transmitting, by the user equipment to the radio access network node, the analyzed buffered logical channel group uplink traffic corresponding to the at least one determined logical channel group according to the at least one granted uplink resource.

Figure 9:
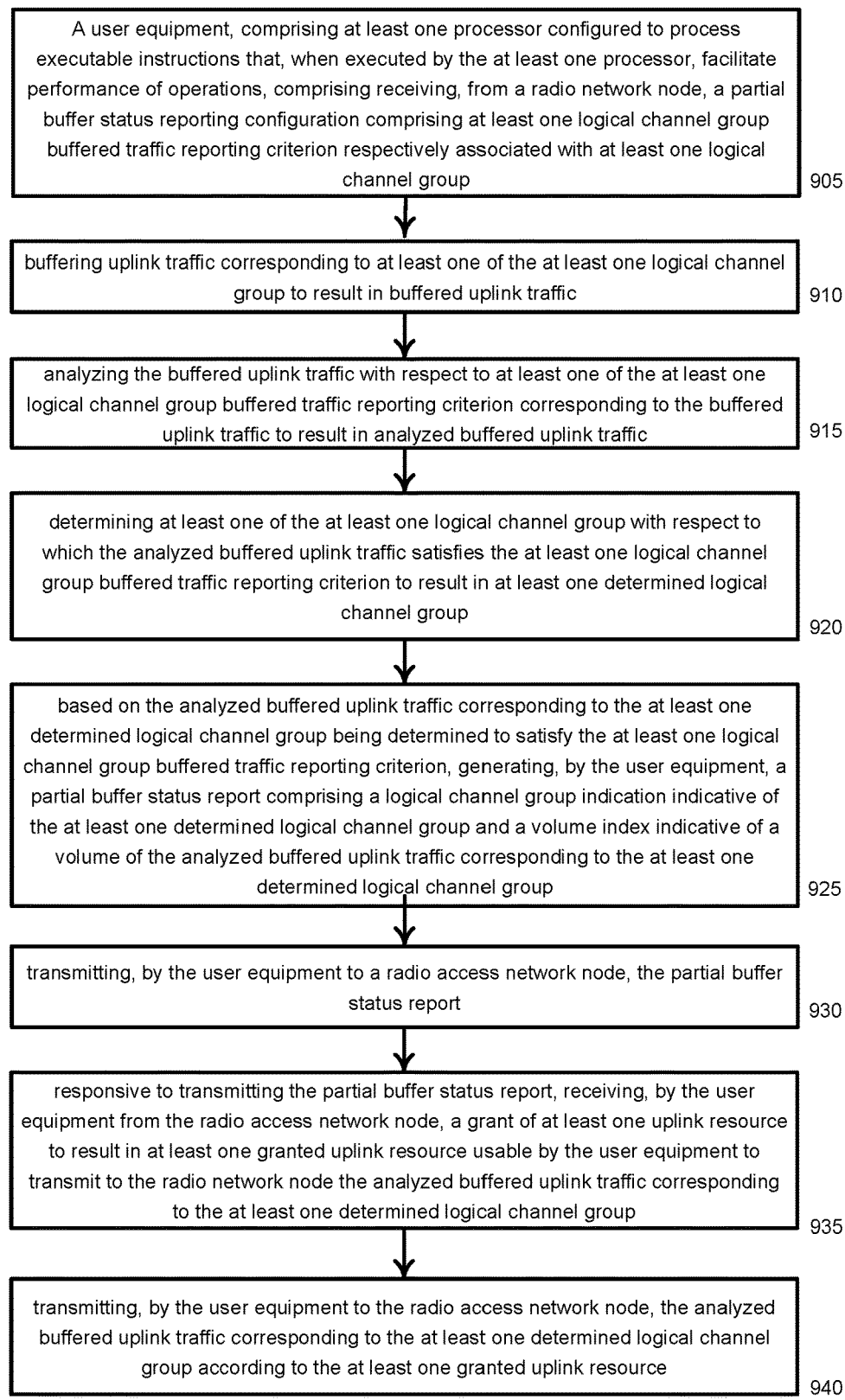
FIG. 9 illustrates a block diagram of an example user equipment.

Turning now to FIG. 9, the figure illustrates an example user equipment 900, comprising at block 905 at least one processor configured to process executable instructions that, when executed by the processor, facilitate performance of operations, comprising receiving, from a radio network node, a partial buffer status reporting configuration comprising at least one logical channel group buffered traffic reporting criterion respectively associated with at least one logical channel group; at block 910 buffering uplink traffic corresponding to at least one of the at least one logical channel group to result in buffered uplink traffic; at block 915 analyzing the buffered uplink traffic with respect to at least one of the at least one logical channel group buffered traffic reporting criterion corresponding to the buffered uplink traffic to result in analyzed buffered uplink traffic; at block 920 determining at least one of the at least one logical channel group with respect to which the analyzed buffered uplink traffic satisfies the at least one logical channel group buffered traffic reporting criterion to result in at least one determined logical channel group; at block 925 based on the analyzed buffered uplink traffic corresponding to the at least one determined logical channel group being determined to satisfy the at least one logical channel group buffered traffic reporting criterion, generating, by the user equipment, a partial buffer status report comprising a logical channel group indication indicative of the at least one determined logical channel group and a volume index indicative of a volume of the analyzed buffered uplink traffic corresponding to the at least one determined logical channel group; at block 930 transmitting, by the user equipment to a radio access network node, the partial buffer status report; at block 935 responsive to transmitting the partial buffer status report, receiving, by the user equipment from the radio access network node, a grant of at least one uplink resource to result in at least one granted uplink resource usable by the user equipment to transmit to the radio network node the analyzed buffered uplink traffic corresponding to the at least one determined logical channel group; and at block 940 transmitting, by the user equipment to the radio access network node, the analyzed buffered uplink traffic corresponding to the at least one determined logical channel group according to the at least one granted uplink resource.

Figure 10:
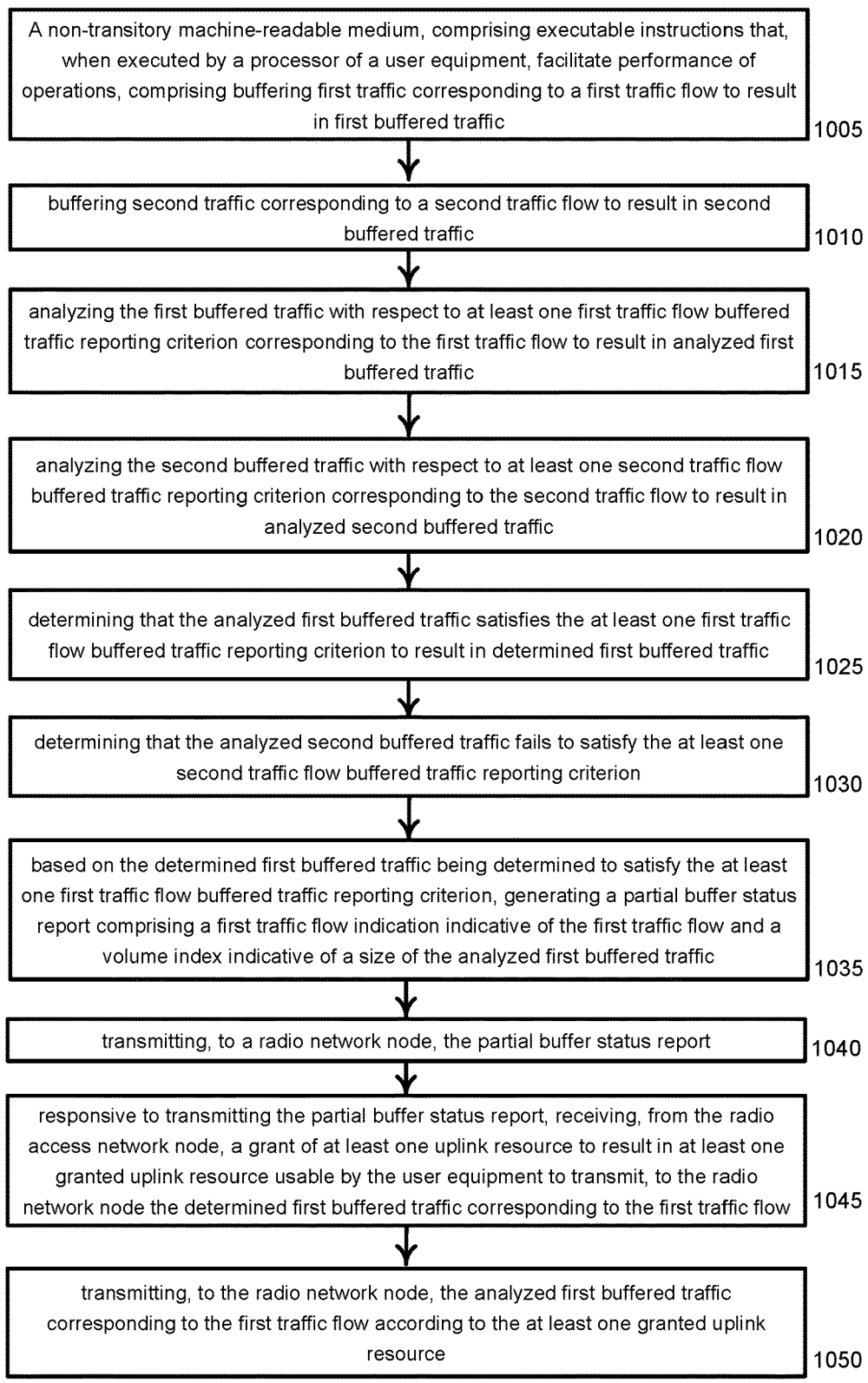
FIG. 10 illustrates a block diagram of an example non-transitory machine-readable medium.

Turning now to FIG. 10, the figure illustrates a non-transitory machine-readable medium 1000 comprising at block 1005 executable instructions that, when executed by a processor of a user equipment, facilitate performance of operations, comprising buffering first traffic corresponding to a first traffic flow to result in first buffered traffic; at block 1010 buffering second traffic corresponding to a second traffic flow to result in second buffered traffic; at block 1015 analyzing the first buffered traffic with respect to at least one first traffic flow buffered traffic reporting criterion corresponding to the first traffic flow to result in analyzed first buffered traffic; at block 1020 analyzing the second buffered traffic with respect to at least one second traffic flow buffered traffic reporting criterion corresponding to the second traffic flow to result in analyzed second buffered traffic; at block 1025 determining that the analyzed first buffered traffic satisfies the at least one first traffic flow buffered traffic reporting criterion to result in determined first buffered traffic; at block 1030 determining that the analyzed second buffered traffic fails to satisfy the at least one second traffic flow buffered traffic reporting criterion; at block 1035, based on the determined first buffered traffic being determined to satisfy the at least one first traffic flow buffered traffic reporting criterion, generating a partial buffer status report comprising a first traffic flow indication indicative of the first traffic flow and a volume index indicative of a size of the analyzed first buffered traffic; at block 1040 transmitting, to a radio network node, the partial buffer status report; at block 1045 responsive to transmitting the partial buffer status report, receiving, from the radio access network node, a grant of at least one uplink resource to result in at least one granted uplink resource usable by the user equipment to transmit, to the radio network node the determined first buffered traffic corresponding to the first traffic flow; and at block 1050 transmitting, to the radio network node, the analyzed first buffered traffic corresponding to the first traffic flow according to the at least one granted uplink resource.

Figure 11:
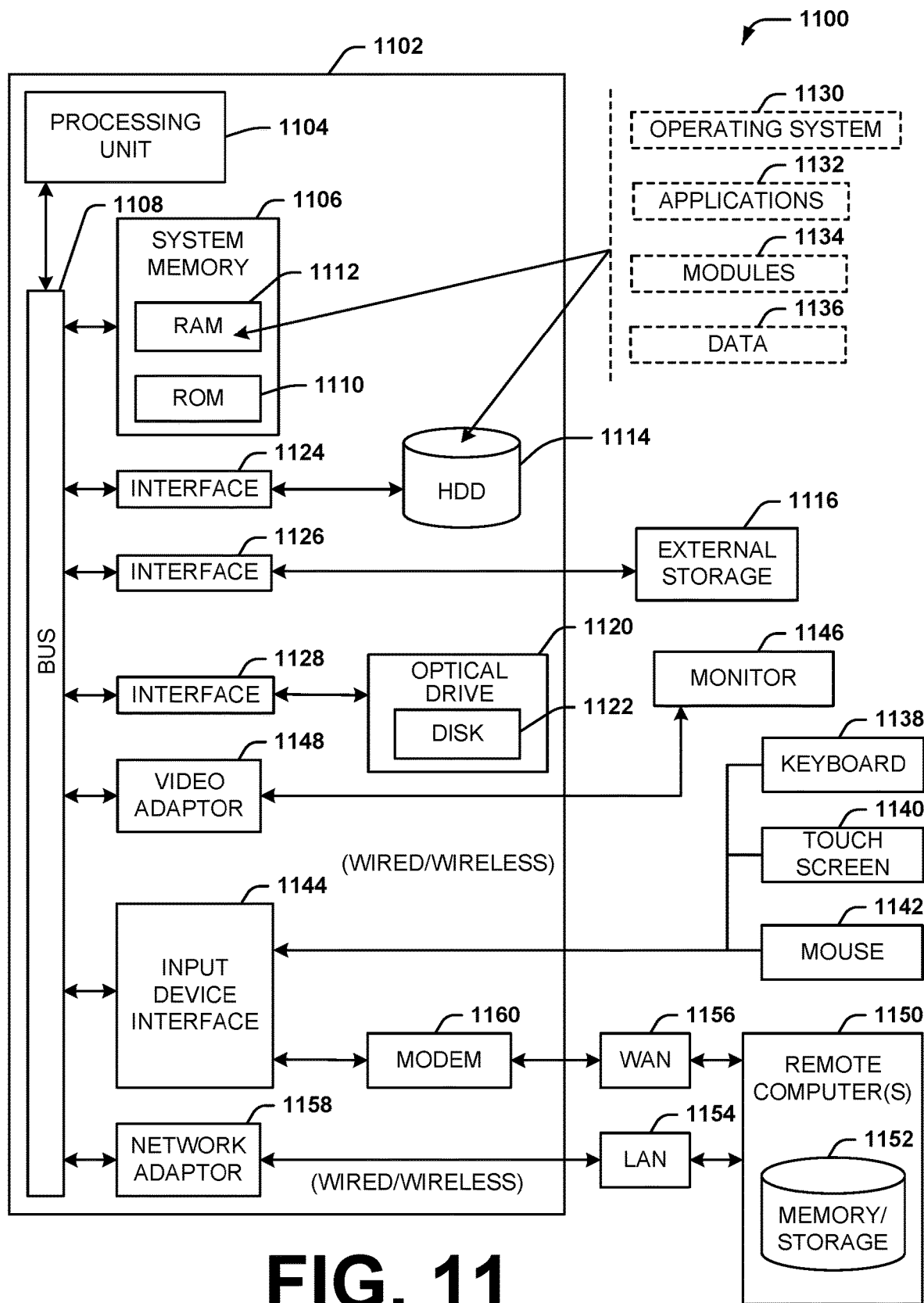
FIG. 11 illustrates an example computer environment.

In order to provide additional context for various embodiments described herein, FIG. 11 and the following discussion are intended to provide a brief, general description of a suitable computing environment 1100 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

Computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
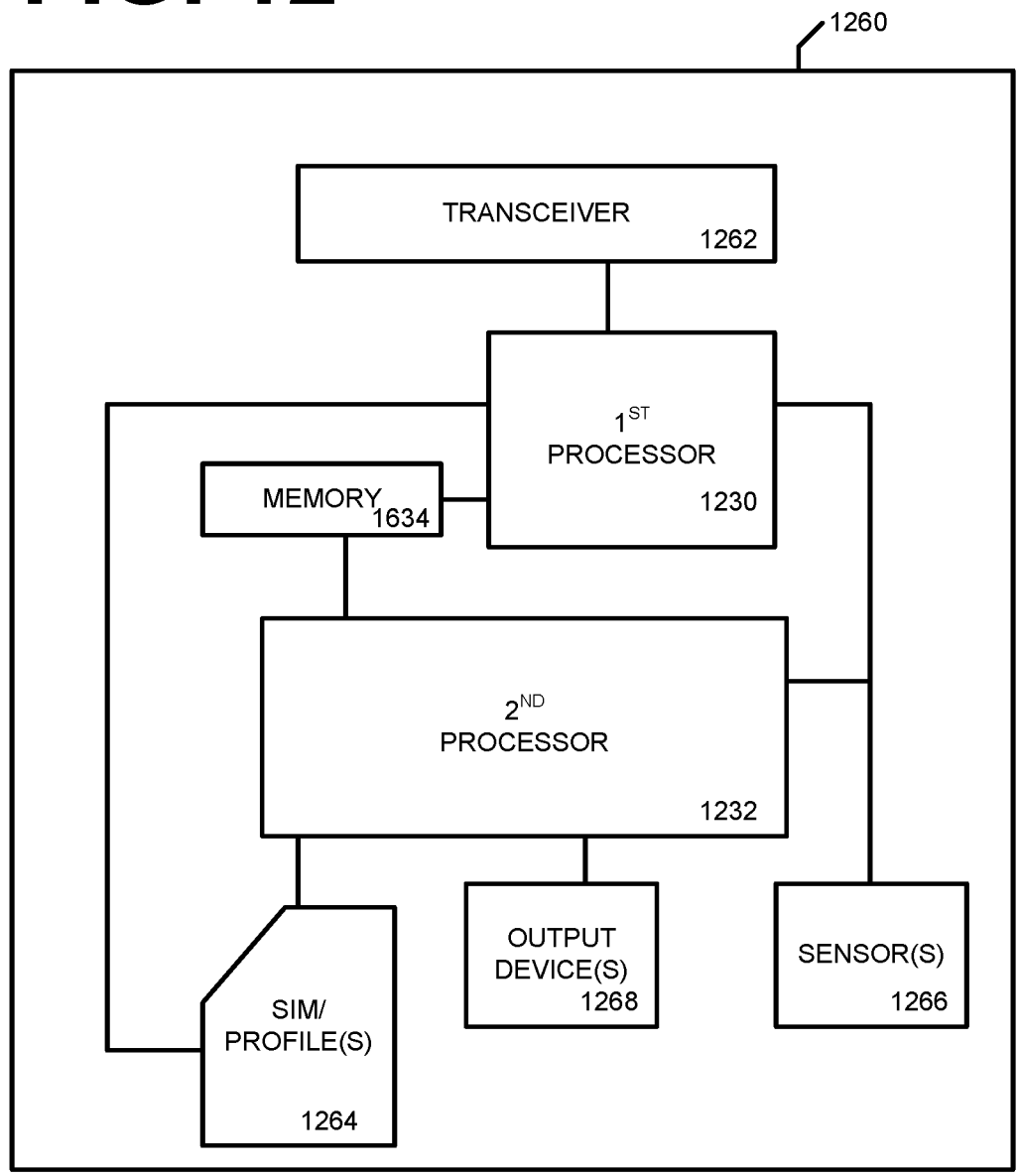
FIG. 12 illustrates a block diagram of an example wireless user equipment.

Turning to FIG. 12, the figure illustrates a block diagram of an example UE 1260. UE 1260 may comprise a smart phone, a wireless tablet, a laptop computer with wireless capability, a wearable device, a machine device that may facilitate vehicle telematics, a tracking device, remote sensing devices, and the like. UE 1260 comprises a first processor 1230, a second processor 1232, and a shared memory 1234. UE 1260 includes radio front end circuitry 1262, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1262 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 12, UE 1260 may also include a SIM 1264, or a SIM profile, which may comprise information stored in a memory (memory 34 or a separate memory portion), for facilitating wireless communication with RAN 105 or core network 130 shown in FIG. 1. FIG. 12 shows SIM 1264 as a single component in the shape of a conventional SIM card, but it will be appreciated that SIM 1264 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1264 and another device, which may be a component of RAN 105 or core network 130 shown in FIG. 1). A SIM profile 1264 may also comprise identifying information that is unique to the SIM, or SIM profile, such as, for example, an International Mobile Subscriber Identity ("IMSI") or information that may make up an IMSI.

SIM 1264 is shown coupled to both the first processor portion 1230 and the second processor portion 1232. Such an implementation may provide an advantage that first processor portion 1230 may not need to request or receive information or data from SIM 1264 that second processor 1232 may request, thus eliminating the use of the first processor acting as a 'go-between' when the second processor uses information from the SIM in performing its functions and in executing applications. First processor 1230, which may be a modem processor or a baseband processor, is shown smaller than processor 1232, which may be a more sophisticated application processor, to visually indicate the relative levels of sophistication (i.e., processing capability and performance) and corresponding relative levels of operating power consumption levels between the two processor portions. Keeping the second processor portion 1232 asleep/inactive/in a low power state when UE 1260 does not need it for executing applications and processing data related to an application provides an advantage of reducing power consumption when the UE only needs to use the first processor portion 1230 while in listening mode for monitoring routine configured bearer management and mobility management/maintenance procedures, or for monitoring search spaces that the UE has been configured to monitor while the second processor portion remains inactive/asleep.

UE 1260 may also include sensors 1266, such as, for example, temperature sensors, accelerometers, gyroscopes, barometers, moisture sensors, and the like that may provide signals to the first processor 1230 or second processor 1232. Output devices 1268 may comprise, for example, one or more visual displays (e.g., computer monitors, VR appliances, and the like), acoustic transducers, such as speakers or microphones, vibration components, and the like. Output devices 1268 may comprise software that interfaces with output devices, for example, visual displays, speakers, microphones, touch sensation devices, smell or taste devices, and the like, that are external to UE 1260.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| WTRU | Wireless transmit receive unit |
| QCI | QoS Class Identifiers |
| BSR | Buffer status report |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
analyzing, by a user equipment comprising at least one processor, uplink traffic, buffered by the user equipment and associated with at least one logical channel group, with respect to at least one logical channel group buffered traffic reporting criterion to result in analyzed buffered logical channel group uplink traffic;
determining by the user equipment, at least one of the at least one logical channel group with respect to which the analyzed buffered logical channel group uplink traffic satisfies the at least one logical channel group buffered traffic reporting criterion to result in at least one determined logical channel group;
based on the analyzed buffered logical channel group uplink traffic corresponding to the at least one determined logical channel group being determined to satisfy the at least one logical channel group buffered traffic reporting criterion, generating, by the user equipment, a partial buffer status report comprising a logical channel group indication indicative of the at least one determined logical channel group and a volume index indicative of a size of the analyzed buffered logical channel group uplink traffic corresponding to the at least one determined logical channel group;
transmitting, by the user equipment to a radio access network node, the partial buffer status report;
responsive to transmitting the partial buffer status report, receiving, by the user equipment from the radio access network node, a grant of at least one uplink resource to result in at least one granted uplink resource usable by the user equipment to transmit to the radio access network node the analyzed buffered logical channel group uplink traffic corresponding to the at least one determined logical channel group; and
transmitting, by the user equipment to the radio access network node, the analyzed buffered logical channel group uplink traffic corresponding to the at least one determined logical channel group according to the at least one granted uplink resource.

2. The method of claim 1, wherein the partial buffer status report excludes information corresponding to at least one of the at least one logical channel group other than the at least one determined logical channel group.

3. The method of claim 1, wherein the at least one logical channel group buffered traffic reporting criterion comprises at least one buffered traffic volume criterion corresponding to the at least one logical channel group.

4. The method of claim 1, wherein the at least one logical channel group buffered traffic reporting criterion comprises at least one buffered traffic delay criterion corresponding to the at least one logical channel group.

5. The method of claim 1, wherein the at least one logical channel group buffered traffic reporting criterion is based on a quality-of-service associated with the at least one logical channel group.

6. The method of claim 1, wherein the at least one logical channel group comprises a first logical channel group and a second logical channel group, and wherein the at least one logical channel group buffer traffic reporting criterion comprises a first logical channel group buffer traffic reporting criterion and a second logical channel group buffer traffic reporting criterion corresponding, respectively, to the first logical channel group and the second logical channel group.

7. The method of claim 1, wherein the partial buffer status reporting configuration is received from the radio access network node.

8. The method of claim 1, further comprising:
executing, by the user equipment, an application, wherein the application generates the uplink traffic, buffered by the user equipment and associated with at least one logical channel group; and
based on the application, determining, by the user equipment, the at least one logical channel group buffered traffic reporting criterion.

9. The method of claim 1, wherein the uplink traffic, buffered by the user equipment and associated with at least one logical channel group, corresponds to downlink traffic associated with the at least one logical channel group, and the method further comprising:
based on the downlink traffic, determining, by the user equipment, the at least one logical channel group buffered traffic reporting criterion.

10. The method of claim 1, wherein the user equipment is a machine-to-machine device.

11. A user equipment, comprising at least one processor configured to process executable instructions that, when executed by the at least one processor, facilitate performance of operations, comprising:
receiving, from a radio network node, a partial buffer status reporting configuration comprising at least one logical channel group buffered traffic reporting criterion respectively associated with at least one logical channel group;
buffering uplink traffic corresponding to at least one of the at least one logical channel group to result in buffered uplink traffic;
analyzing the buffered uplink traffic with respect to at least one of the at least one logical channel group buffered traffic reporting criterion corresponding to the buffered uplink traffic to result in analyzed buffered uplink traffic;
determining at least one of the at least one logical channel group with respect to which the analyzed buffered uplink traffic satisfies the at least one logical channel group buffered traffic reporting criterion to result in at least one determined logical channel group;
based on the analyzed buffered uplink traffic corresponding to the at least one determined logical channel group being determined to satisfy the at least one logical channel group buffered traffic reporting criterion, generating, by the user equipment, a partial buffer status report comprising a logical channel group indication indicative of the at least one determined logical channel group and a volume index indicative of a volume of the analyzed buffered uplink traffic corresponding to the at least one determined logical channel group;
transmitting, by the user equipment to a radio access network node, the partial buffer status report;
responsive to transmitting the partial buffer status report, receiving, by the user equipment from the radio access network node, a grant of at least one uplink resource to result in at least one granted uplink resource usable by the user equipment to transmit to the radio network node the analyzed buffered uplink traffic corresponding to the at least one determined logical channel group; and transmitting, by the user equipment to the radio access network node, the analyzed buffered uplink traffic corresponding to the at least one determined logical channel group according to the at least one granted uplink resource.

12. The user equipment of claim 11, wherein the partial buffer status reporting configuration further comprises a non-partial buffer status report periodicity, and wherein the operations further comprise:

determining an uplink channel congestion condition with respect to the radio network node to result in a determined uplink channel congestion condition; and based on the determined uplink channel congestion condition, avoiding transmitting a non-partial buffer status report according to the non-partial buffer status report periodicity.

13. The user equipment of claim 12, wherein the determining the determined uplink channel congestion condition comprises the analyzed buffered uplink traffic corresponding to the at least one determined logical channel group being determined to satisfy the at least one logical channel group buffered traffic reporting criterion.

14. The user equipment of claim 11, wherein the at least one of the at least one logical channel group buffered traffic reporting criterion comprises a first buffered traffic volume criterion corresponding to a first logical channel group of the at least one logical channel group and a second buffered traffic volume criterion corresponding to a second logical channel group of the at least one logical channel group, wherein the analyzed buffered uplink traffic comprises first analyzed buffered uplink traffic corresponding to the first logical channel group and second analyzed buffered uplink traffic corresponding to the second logical channel group, wherein the first analyzed buffered uplink traffic is determined to satisfy the at least one logical channel group buffered traffic reporting criterion based on the analyzed buffered uplink traffic comprising a first volume of buffered uplink traffic corresponding to the first logical channel group being not less than the first buffered traffic volume criterion, wherein the second analyzed buffered uplink traffic is determined not to satisfy the at least one logical channel group buffered traffic reporting criterion based on the analyzed buffered uplink traffic comprising a second volume of buffered uplink traffic corresponding to the second logical channel group being not greater than the second buffered traffic volume criterion, wherein the volume index is indicative of the first volume of buffered uplink traffic, and wherein the partial buffer status report excludes information indicative of the second volume of buffered uplink traffic.

15. The user equipment of claim 11, wherein the at least one of the at least one logical channel group buffered traffic reporting criterion comprises a first buffered traffic delay criterion corresponding to a first logical channel group of the at least one logical channel group and a second buffered traffic delay criterion corresponding to a second logical channel group of the at least one logical channel group, wherein the analyzed buffered uplink traffic comprises first analyzed buffered uplink traffic corresponding to the first logical channel group and second analyzed buffered uplink traffic corresponding to the second logical channel group, wherein the first analyzed buffered uplink traffic is determined to satisfy the at least one logical channel group buffered traffic reporting criterion based on the analyzed buffered uplink traffic comprising at least one first packet, corresponding to the first logical channel group, having a remaining delay budget not greater than the first buffered traffic delay criterion, wherein the second analyzed buffered uplink traffic is determined not to satisfy the at least one logical channel group buffered traffic reporting criterion based on the analyzed buffered uplink traffic comprising a second packet, corresponding to the second logical channel group, having a remaining delay budget not less than the second buffered traffic delay criterion, wherein the volume index is indicative of a first volume of buffered uplink traffic corresponding to the first logical channel group, and wherein the partial buffer status report excludes information indicative of a second volume of buffered uplink traffic corresponding to the second logical channel group.

16. The user equipment of claim 11, wherein the partial buffer status reporting configuration comprises a partial buffer status reporting enabled indication indicative to the user equipment that the radio network node has enabled partial buffer status reporting based on the radio network node determining that an uplink congestion value corresponding to at least one uplink resource associated with the radio network node satisfies at least one congestion criterion.

17. A non-transitory machine-readable medium, comprising executable instructions that, when executed by a processor of a user equipment, facilitate performance of operations, comprising:

buffering first traffic corresponding to a first traffic flow to result in first buffered traffic;

buffering second traffic corresponding to a second traffic flow to result in second buffered traffic;

analyzing the first buffered traffic with respect to at least one first traffic flow buffered traffic reporting criterion corresponding to the first traffic flow to result in analyzed first buffered traffic;

analyzing the second buffered traffic with respect to at least one second traffic flow buffered traffic reporting criterion corresponding to the second traffic flow to result in analyzed second buffered traffic;

determining that the analyzed first buffered traffic satisfies the at least one first traffic flow buffered traffic reporting criterion to result in determined first buffered traffic;

determining that the analyzed second buffered traffic fails to satisfy the at least one second traffic flow buffered traffic reporting criterion;

based on the determined first buffered traffic being determined to satisfy the at least one first traffic flow buffered traffic reporting criterion, generating a partial buffer status report comprising a first traffic flow indication indicative of the first traffic flow and a volume index indicative of a size of the analyzed first buffered traffic;

transmitting, to a radio network node, the partial buffer status report;

responsive to transmitting the partial buffer status report, receiving, from the radio access network node, a grant of at least one uplink resource to result in at least one granted uplink resource usable by the user equipment to transmit, to the radio network node, the determined first buffered traffic corresponding to the first traffic flow; and transmitting, to the radio network node, the analyzed first buffered traffic corresponding to the first traffic flow according to the at least one granted uplink resource.

18. The non-transitory machine-readable medium of claim 17, wherein the generating the partial buffer status report comprises:
  retrieving, from a configured first buffer stratus report table corresponding to the first traffic flow, the volume index.

19. The non-transitory machine-readable medium of claim 17, wherein the partial buffer status report excludes information corresponding to the analyzed second buffered traffic.

20. The non-transitory machine-readable medium of claim 17, wherein the first buffered traffic comprises first buffered uplink traffic corresponding to a first logical channel group, and wherein the second buffered traffic comprises second buffered uplink traffic corresponding to a second logical channel group.

* * * * *